United States Patent [19]

Snekkenes

[11] Patent Number: 4,850,134

[45] Date of Patent: Jul. 25, 1989

[54] GROWTH CHAMBER WITH SOLAR ENERGY ABSORBER

[76] Inventor: Torbjorn A. Snekkenes, Brunla, N-3290 Stavern, Norway

[21] Appl. No.: 58,608

[22] Filed: Jun. 4, 1987

Related U.S. Application Data

[63] Continuation of Ser. No. 505,828, Jun. 20, 1983, abandoned, which is a continuation-in-part of Ser. No. 285,084, filed as PCT NO80/00038 on Nov. 27, 1980, published as WO81/01495 on Jun. 11, 1981, abandoned.

[30] Foreign Application Priority Data

Nov. 28, 1979 [NO] Norway ............................. 793859

[51] Int. Cl.$^4$ .................... A01G 9/00; A01G 13/04
[52] U.S. Cl. ................................. 47/18; 47/19; 47/29
[58] Field of Search ............... 126/429; 47/17, 18, 47/39, 2, 41.11, 41.1, 79, 19, 29; 98/114

[56] References Cited

U.S. PATENT DOCUMENTS

| | | | |
|---|---|---|---|
| 783,182 | 2/1905 | DeMeyere | 47/19 |
| 894,615 | 7/1908 | Elder | 47/18 |
| 2,015,924 | 10/1935 | Lohrbe | 47/18 |
| 2,226,812 | 12/1940 | Goldberg | 47/28 |
| 2,638,715 | 5/1953 | Schroeder | 47/18 |
| 3,106,801 | 10/1963 | Riacher | 47/17 |
| 3,124,903 | 3/1964 | Truhan | 47/17 |
| 3,305,968 | 2/1967 | Dosedla et al. | 47/62 |
| 3,492,761 | 2/1970 | Taylor | 47/17 |
| 3,542,210 | 11/1970 | Sorensen | 47/39 X |
| 3,638,368 | 2/1972 | Pierson | 47/28 X |
| 3,727,345 | 4/1973 | Smith | 47/2 |
| 3,760,534 | 9/1973 | Choux et al. | 47/39 |
| 3,889,416 | 6/1975 | Bergeron et al. | 47/39 X |
| 4,018,004 | 4/1977 | Soffer | 47/39 |
| 4,027,437 | 6/1977 | Monsky et al. | 47/28.1 A X |
| 4,057,930 | 11/1977 | Barham | 47/79 X |
| 4,091,566 | 5/1978 | Hovath et al. | 47/17 |
| 4,148,154 | 4/1979 | King | 47/17 X |
| 4,154,220 | 5/1979 | Loth | 126/429 X |
| 4,223,666 | 9/1980 | Wasserman | 126/429 |
| 4,760,534 | 9/1973 | Choux et al. | 47/39 |

FOREIGN PATENT DOCUMENTS

| | | | |
|---|---|---|---|
| 8717 | 3/1980 | European Pat. Off. | 47/19 |
| 2318187 | 11/1970 | Fed. Rep. of Germany | 47/39 |
| 1757736 | 5/1971 | Fed. Rep. of Germany | . |
| 2231928 | 3/1974 | Fed. Rep. of Germany | . |

(List continued on next page.)

OTHER PUBLICATIONS

Translation of Norwegian Patent #793,859 to T. A. Snekkenes, Filing date of 11/28/79.

Primary Examiner—Robert A. Hafer
Assistant Examiner—D. Neal Muir
Attorney, Agent, or Firm—Scully, Scott, Murphy & Presser

[57] ABSTRACT

Arrangement for greenhouses or growth rooms for enhancing the growth of plants and germination of seeds, comprising a bottom (4) and a plant supporting device (1) with holes or slots (2) for the flowing therethrough of climatically conditioned air, the device (1) being arranged at a vertical distance from the bottom (4) so as to provide a space for the introduction of climatically conditioned air between the bottom (4) and plant supporting device (1). The plant supporting device (1) is formed of a tray of clear plastics or of another material penetrable by heat radiation having depressions (14) or openings (3) for insertion therein of the root system of the plants or for receiving seeds, and with holes or slots (2) between the depressions (14) or openings (3). Further, the bottom (4) is heated insulated (9) and has a surface (8) capable of absorbing radiant energy and possibly moisture. The surface (8) of the bottom (4) may be provided with grooves (16) for water or liquid nourishment, and the arrangement may include an upper, flat shadowing means or insulating means (15) the height of which above the plant tray (1) being adjustable in accordance with the height of the plant stratum (7).

7 Claims, 3 Drawing Sheets

FOREIGN PATENT DOCUMENTS

| | | |
|---|---|---|
| 1944539 | 4/1975 | Fed. Rep. of Germany . |
| 2065768 | 8/1975 | Fed. Rep. of Germany . |
| 2626902 | 12/1977 | Fed. Rep. of Germany . |
| 2709181 | 9/1978 | Fed. Rep. of Germany .......... 47/17 |
| 2812324 | 9/1979 | Fed. Rep. of Germany . |
| 2850764 | 5/1980 | Fed. Rep. of Germany . |
| 619253 | 3/1927 | France . |
| 665405 | 9/1929 | France . |
| 782229 | 1/1936 | France . |
| 969317 | 7/1948 | France ..................................... 47/18 |
| 2214397 | 8/1974 | France . |
| 2229346 | 12/1974 | France ..................................... 47/17 |
| 2354701 | 6/1976 | France . |
| 7713224 | 6/1979 | Netherlands ............................. 47/39 |
| 7908582 | 6/1980 | Netherlands ............................. 47/18 |
| 81/01495 | 6/1981 | PCT Int'l Appl. . |
| 163313 | 5/1958 | Sweden . |
| 325165 | 6/1970 | Sweden . |
| 356668 | 6/1973 | Sweden . |
| 480781 | 12/1969 | Switzerland . |
| 3596 | of 1892 | United Kingdom .................... 47/19 |
| 384395 | 12/1932 | United Kingdom .................... 47/19 |
| 1020945 | 2/1966 | United Kingdom . |
| 2060342 | 5/1981 | United Kingdom .................... 47/39 |

GROWTH CHAMBER WITH SOLAR ENERGY ABSORBER

This application is a continuation of application Ser. No. 505,828, filed June 20, 1983, which is a continuation-in-part of commonly assigned U.S. patent application Ser. No. 285,084 filed July 13, 1981, which claims priority of Norwegian patent application Ser. No. 793,859, filed Nov. 28, 1979, through International PCT patent application Ser. No. PCT/NO80/00038 filed Nov. 27, 1980.

TECHNICAL FIELD

The invention relates to an arrangement for greenhouses or growth rooms for enhancing the growth of plants or the germination of seeds, ensuring that the plants or the seeds at all time will be subjected to climatically controlled conditions which are favorable to the growth of the plants or to the germination of the seeds.

BACKGROUND ART

In the production of plants it is of importance to the well-being and the growth of the plants that the temperature and the humidity of the air are kept at a suitable level and that there is only a restricted temperature difference between the foliage and the root system. Thus, the root temperature of the plants should not exceed the temperature of the foliage by more than about 8° C.

In greenhouses in the northern hemisphere, a sunny day during the winter period yields significant heat surplus during the day whereas a large heat demand is required during the night. The heat surplus during the day is usually vented and will thus be lost whereas heat must be supplied during the night. The entire greenhouse is then heated in order to develop suitable temperature conditions for the plants.

In plant production it is known to use plant trays having depressions ("pots") in which the seeds are sown or the plants are planted. At the bottom of these pots there are openings e.g. for drainage of surplus moisture upon watering. The plant trays may have a size of 30×40 cm and provide space for about 96 plants. The use of such plant trays suffers from the disadvantage that heat from the sun or other light sources may lead to undesirably high temperatures both in the plant stratum and in the roots with the consequence that the growth decreases. The plant trays are usually prepared from non-transparent plastics. Moreover, translucent plant trays would suffer from the same disadvantage because the support for the trays would then absorb surplus heat which would again be dissipated to the plants.

The foliage of the plants is also sensitive towards the rate of air flow to which it is exposed. This should not exceed about 0.4 m/sec.

In U.S. Pat. No. 3,492,761 an arrangement in a growth chamber is disclosed, the arrangement comprising a perforated floor for supporting plants thereon and serving to divide the growth chamber into an upper and a lower space. The floor is formed of sheet material shaped to include a series of parallel, spaced-apart ridges defining channels therebetween, the ridges extending substantially uniformly across the entire floor. The ridges have upper surfaces disposed sufficiently close together to support plant pots thereon with such pots straddling the channels. The channels have vertically extending sidewalls with holes extending therethrough for conditioned air to flow from the lower space in the growth chamber and generally horizontally into the channels in which the air dissipates kinetic energy and then at low velocity flows vertically upwardly from the channels into the upper space around the sides of the pots.

It is suggested in the U.S. patent specification that the floor may be constructed from sheet metal. Accordingly, by incident sunlight the floor will be very strongly heated with the risk of excessive heating of the plant roots, and the known arrangement does not offer the possibility of having climatically controlled air flowing around the root system of the plants at another velocity that the velocity of the air with which the foliage of the plants comes into contact, the conditioned air according to the known arrangement flowing upwardly at approximately the same velocity past the pot and the foliage of the plants.

It is an object of the invention to provide an arrangement in greenhouses or growth rooms enabling the heat consumption to be reduced and simultaneously ensuring that both plant roots and foliage are subjected to favourable climatic conditions and enabling uptake of surplus heat without subjecting the plants to inacceptable air movements, or enabling the surplus energy to be stored in a liquid filled tank or in another manner, thereby enabling energy savings and climatic control suitable for the production of plants both in conventional greenhouses and in growth rooms based on the supply of artificial light only.

SUMMARY OF THE INVENTION

Accordingly, the invention relates to an arrangement in greenouses or growth rooms for enhancing the growth of plants or germination of seeds, comprising a bottom and a plant supporting device provided with holes or slots for the flowing therethrough of climatically conditioned air, the device being arranged at a vertical distance from the bottom so as to provide a space for the introduction of climatically conditioned air between the bottom and the plant supporting device, and the arrangement is characterized therein so that the plant supporting device is formed of a tray of clear plastics or of another heat penetrable material having depressions or openings for placing the root system of the plants therein or for receiving seeds, and with holes or slots between the depressions or openings, and in that the bottom is heat insulated and has a surface capable of absorbing radiant energy and possibly moisture.

According to a preferred embodiment of the invention the surface of the bottom is provided with channels for water or liquid nourishment, and it is a further preferred embodiment of the invention that the arrangement comprises an upper, flat shadowing means or insulating means having a height above the plant tray which is adjustable in accordance with the height of the plant stratum.

According to the invention it has been recognized that by forming an air space below plant trays provided with depressions or stamped out openings and formed of clear plastics or of another heat penetrable material the portion of the energy from the sun and from other light sources which is not absorbed by the foliage of the plants will penetrate through the trays and down into the room below. This is provided with an insulated bottom having a radiant energy absorbing and possible porous surface which may take up drainage water from the plants and possibly constitute a reservoir for plant nourishment. Grooves for circulating liquid nourishment may also be arranged in the bottom. The root system of the plants will, in the enveloped or nonenveloped form, extend down into the air space to which climatically conditioned air is supplied, and the plant trays are provided with holes between the depressions or openings of the plant tray so that climatically conditioned air which is introduced into the air space between the bottom and the plant trays, directly or indirectly, will flow around the root system of the plants and then up through the holes in the plant trays.

DETAILED DESCRIPTION OF THE PREFERRED EMBODIMENTS AND DRAWINGS

Figure 1:
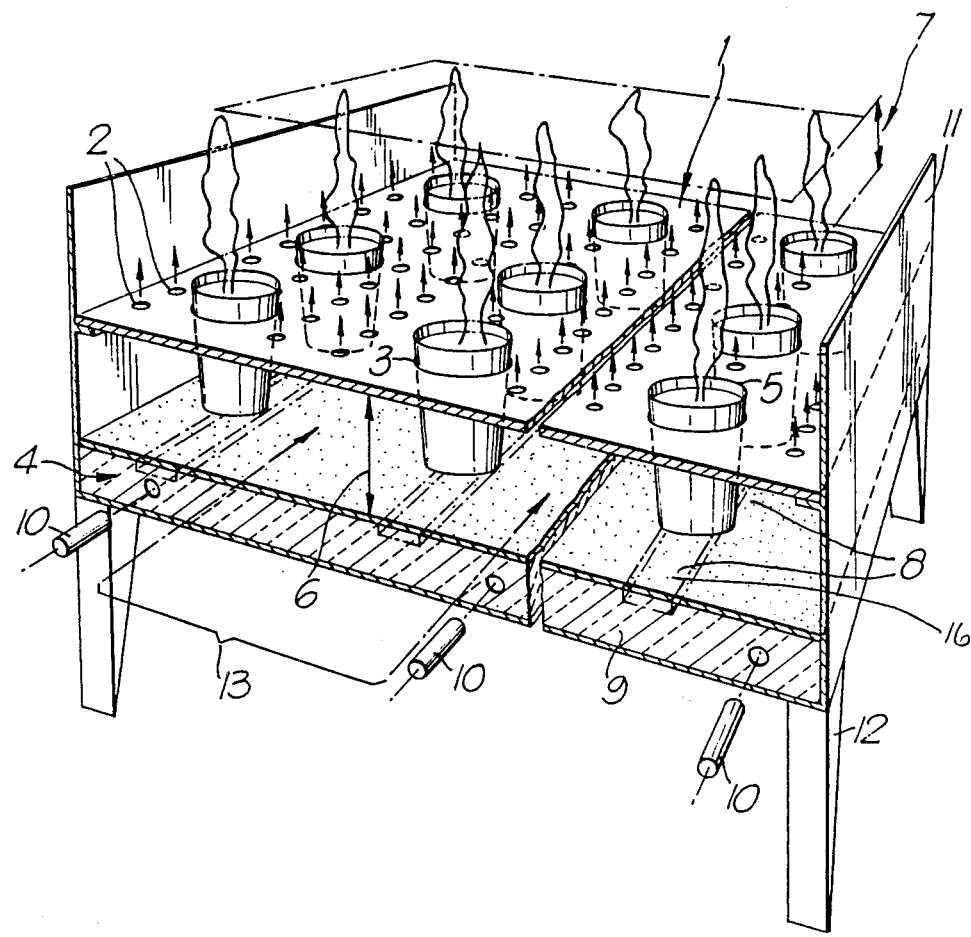
FIG. 1 is a schematic plan view of the Greenhouse Arrangement of the present invention showing the growing plants inserted in pots.

FIG. 1 schematically shows, in the form of an example, a plant tray 1, holes 2 for the passage therethrough of climatically conditioned air, openings 3 in the plant tray, a bottom 4, plant pots 5 introduced into the openings, an air space (pressure chamber) 6 between the plant tray 1 and the bottom 4, and a plant stratum 7. A hygroscopic, heat radiation absorbing surface 8 is provided with grooves 16 for liquid nourishment. The bottom 4 is constructed of a heat insulating material 9. When assembling several plant trays it is also advantageous that the plant trays are provided with a guiding pin 10. The plant trays may also be assembled according to the mortise and tenon principle. In order to increase the possibility of obtaining quiet air conditions in the plant stratum 7 the arrangement may further be provided with separating walls 11 in order to restrict any undesired turbulence caused by air penetrating in from the surrounding room. Moreover, according to the embodiment shown in FIG. 1 the arrangement is supported by legs 12, however, it is clear that the arrangement may also be supported in another manner, e.g., on rails or rolls or simply directly on the ground.

The introduction of climatically conditioned pressurized air 13 into the pressure chamber 6 between the plant tray 1 and the surface 8 of the bottom 4 has been shown by means of arrows.

Figure 2:
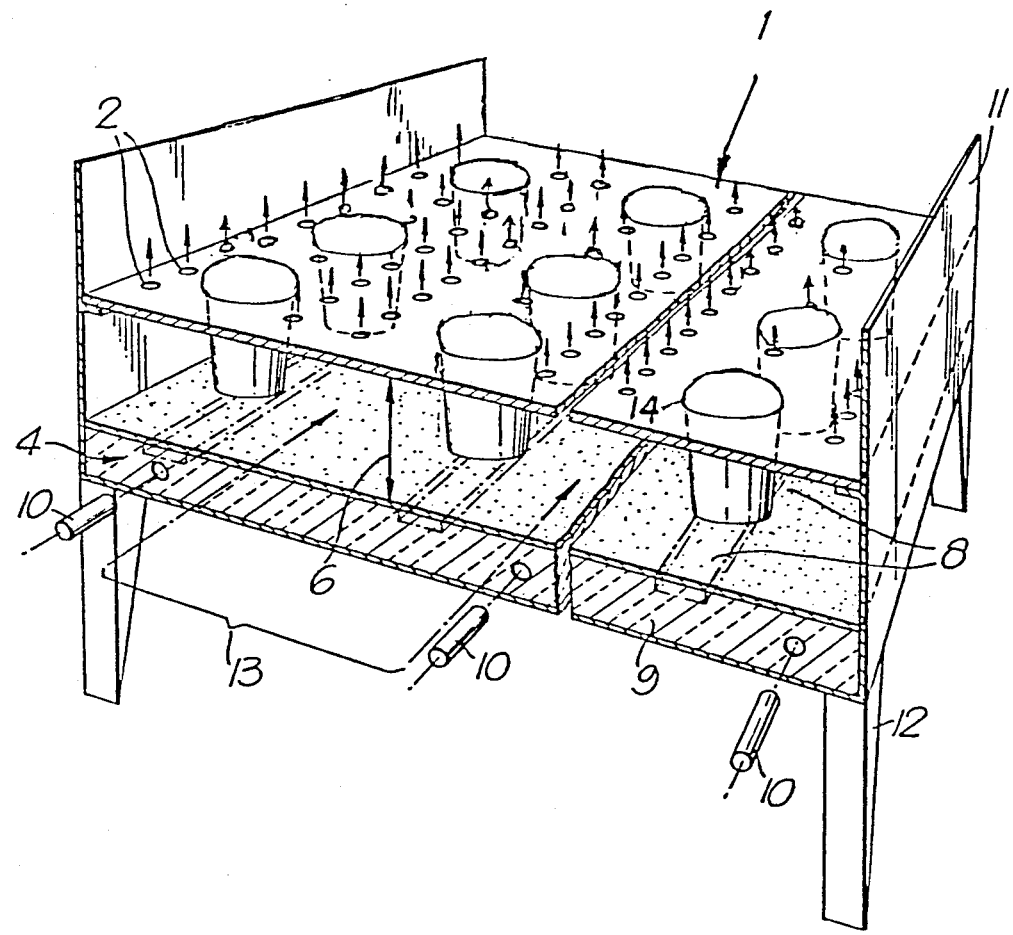
FIG. 2 is a schematic plan view of the Greenhouse Arrangement of the present invention illustrating the depressions provided for germinating seeds.

FIG. 2 of the drawings serves to illustrate the embodiment where the plant tray 1 is provided with depressions 14, the bottoms of which rest against the surface 8 of the bottom 4, according to the embodiment shown so as to span across grooves 16 in the surface 8 for supply of water or liquid nourishment through a hole or holes (not shown) in the bottom of the depressions 14 and into the cultivating medium, e.g., soil, to be filled into the depressions 14 when using this arrangement according to the invention. Of course, plant pots of suitable size may also be received in the depressions 14.

Figure 3:
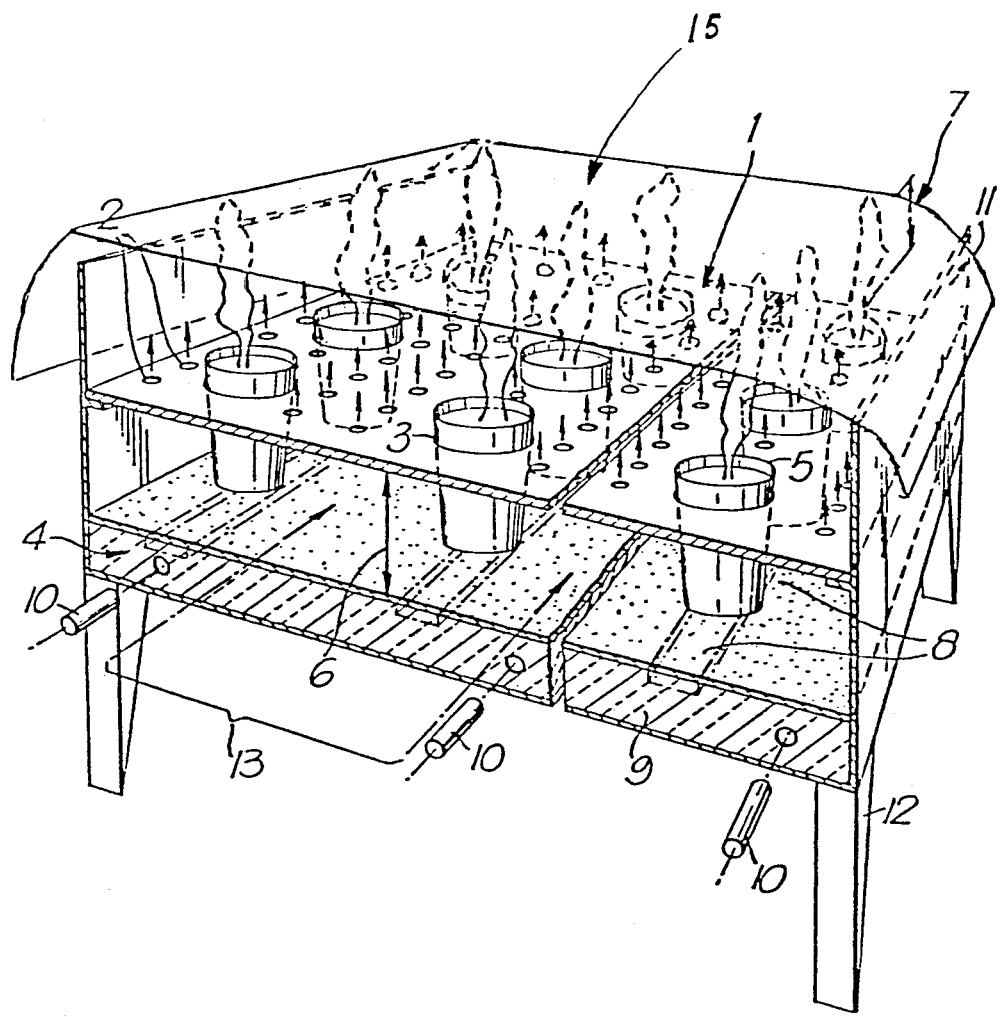
FIG. 3 is a schematic plan view of the Greenhouse Arrangement of FIG. 1 which illustrates a covering for providing insulation or shadow.

FIG. 3 of the drawings is identical to FIG. 1 but additionally shows a flat insulating or shadowing cover 15 which is adjustably supported above the plant stratum 7 by the flow of the climatically conditioned air which rises through the holes 2 of the plant tray 1. Of course, the flow of air has to be strong enough to support and keep the cover 15 floating at a level above the plant tray 1 so that the cover does not touch the top of the tallest plants of the plant tray.

The moisture content, the temperature and the pressure of the pressurized air are centrally controlled and adjusted in accordance with the conditions which at any time will yield the optimum plant growth. Thus, when the surrounding air in the greenhouse or in the growth room has a low temperature, pressurized air having a suitable temperature, e.g., 21° C., is introduced into the pressure chamber 6 at such pressure and at such velocity that it is ensured that the air rising up through the holes 2 in the plant tray 1 will form an air cushion in the plant stratum 7 so that the temperature drop from the surface of the plant tray to the top of the plant will preferably not be more than 3° C. However, as mentioned the difference between the root temperature and the temperature of the foliage of the plants may be up to 8° C., however, the difference preferably ought not to exceed 6° C.

Oppositely, when the temperature in the surrounding room is high due to supply of large amounts of radiant energy, the climatically conditioned pressurized air is introduced at such a temperature that a cooling will take place in the plant stratum 7 compared with the temperature which this would otherwise have acquired. The radiant energy which under such conditions would normally have been absorbed by the plants and/or by the conventional plant trays will essentially pass through the present plant trays 1 because these are formed of clear plastics and/or of another material penetrable by heat and will be absorbed in the insulated bottom 4.

Suitable materials for the plant tray 1 may include, for example, shock resistant polystyrene or clear polyvinyl chloride having a thickness of about 0.5 mm, the sheets having been thermally shaped. Also transparent glass sheets of various thicknesses may be used, the criterion being that the plant tray material should absorb as little heat as possible and be essentially self-supporting.

The openings 3 of the plant tray 1 can be of any shape but the most usual shape is circular or rectangular, e.g., square, with diameters or side lengths varyings, e.g., from 3 to 12 cm. Insofar as trays 1 are used which are provided with depressions 14, the depths of these depressions from the surface of the plant tray may vary, e.g., from 3 cm. to 10 cm. Equally, the cross-section of the depressions may vary in the same manner as the shape of the openings 3, and further, the depressions 14 should most suitably be tapered down from the surface of the plant tray 1 and should preferably have the shape of a frustum of a cone or pyramid so as to facilitate removal of the cultivating medium or the plant pots from the depressions.

The obligatory requirement of the bottom 4 is that it should be heat insulated and have a surface 8 capable of absorbing heat radiation. Optionally, the surface 8 of the bottom 4 should also be capable of absorbing moisture. The bottom 4 may be made of any known heat insulating material 9, like foamed polymers. e.g., polystyrene, or mineral wool, glass wool, expanded vermiculite or cork. The surface 8 of the bottom 4 may be integrally formed with the heat insulating material 9 or it may consist of a separate layer or matte of a material capable of absorbing heat radiation and placed upon the heat insulating material. As an example of the first embodiment, a heat insulating matte can be used consisting of mineral wool containing a binding agent so as to lend a certain rigidity to the matte which on its surface is provided with a coating of glass fiber cloth, about 60 microns thick, which has been heat sealed to the mineral wool matte by means of a binding agent between the mineral wool matte and the glass fiber cloth. Such prefabricated insulation mattes are available in thickness of 3 cm., 5 cm., 7.5 cm., and 10 cm., and their volume weight will be about 60 kg/m$^3$ and their k-value 0.04 W/m° C. This surface 8 heat bonded to the heat insulating material 9 has a particularly high capacity for absorbing heat radiation.

As an example of the second embodiment where the surface 8 of the bottom 4 has not been integrally formed with the heat insulating material 9, a so called "capillary matte" of polyethylene may be mentioned having an area weight which may vary between 150 and 250 g/m$^2$, the matte having been produced by a process so as to render it a surface provided with numerous capillaries for absorbing moisture as well as being capable of absorbing heat radiation. The capillary matte may simply be placed upon the underlying heat insulating material 9 of the bottom 4 so as to provide a surface 8 for the bottom 4 capable of absorbing heat radiation and also moisture.

The bottom 4 is located below the plant tray 1 and may be self-supporting or it may be supported by different materials such as wood or fiber boards or even sheet metal. In one embodiment, as shown for example in FIG. 1, the bottom 4 is supported from beneath by legs 12 and provided on each side with separating walls 11 which also support plant tray 1 at an appropriate vertical distance above the bottom surface 8.

It is preferred that the surface 8 of the bottom 4 is provided with grooves 16 for water or liquid nourishment and, further, that the arrangement comprises an upper flat shadowing means or insulating means 15 having a height above the plant tray 1 which is adjustable in agreement with the height of the plant stratum 7.

The latter embodiment is of particular interest in order to avoid a too strong irradiation of the plant and/or in order to obtain a sharp division between the climatically conditioned air which rises up through the plant stratum 7 and the atmosphere above the plant stratum in the greenhouse or the growth room. Thereby it is avoided that portions of the foliage of the plant become too strongly heated or too strongly cooled, respectively, with regard to the temperature which is desired for the foliage and with regard to the temperature of the root system of the plant, and, moreover, this embodiment will contribute significantly to energy savings when temperature in the space above the plant stratum 7 in the greenhouse or the growth room is essentially lower than the temperature which it is desired to maintain in the plant stratum 7. The means for such a covering of the plant stratum may be a thin foil, e.g., of plastics which is kept floating just above the plant stratum due to the climatically conditioned air which rises up through the holes 2 in the plant tray 1. One example of a plastics foil for acting as a heat barrier 15 between the plant stratum 7 and the surrounding atmosphere is a clear foil of polyethylene having a thickness of about 0.08 mm. This foil is very transparent, i.e., non-pigmented. For obtaining the mentioned shadowing effect, a woven cloth of acrylic polymer may be used which affords a reduction in light transmittance of from 20 to 50/60% depending upon its thickness and pigmentation.

This shadowing effect can be increased, i.e., to obtain a so-called day/night effect, by using, e.g., a woven dense cloth of polyethylene filaments pigmented black. It is also possible to use a conventional cloth of black satin in order to obtain the day/night effect, e.g., when it is desired to reduce the growth of the plants. The flat shadowing means and/or insulating means 15 can be simply draped above the plant stratum and kept floating due to the flow of the climatically conditioned air which rises through the holes 2 of the plant trays 1. The shadowing and/or insulating means 15 may simply be rolled off from a device placed alongside the tables with the plant trays 1 thereon, much in the same way as pulling a roller curtain, and simply draped over the tables with some overlap on all sides. This roller curtain system may of course be operated manually or be mechanically driven. The roll or rolls of the shadowing or insulating means 15 should preferably be vertically adjustable so that when there is demand for using the shadowing or insulating means 15 this may be pulled out from the roll and draped over the plant tray or plant trays at a level which is not too different from the level of the upper end of the foliage of the tallest plant in the plant tray or plant trays to be covered by the shadowing or insulating means. However, the precise adjustment of the height of the insulating or shadowing means above the plant tray is accomplished by suitably adjusting the velocity of the climatically conditioned air which rises through the holes 2 in the plant tray 1. Experiments have shown that no difficulties are experienced in keeping the flat cover floating on the upwards stream of air at the desired level above the plant tray so as not to touch the top of the foliage of the tallest plant in the plant tray.

The plant trays 1 which are provided with pressed depressions 14 or stamped out openings 3 for insertion therein of pots 5 or simply for suspending plants therein, e.g., salad plants, so that the root system of the plant will be located below the plant tray 1, may consist of one or several exchangeable tray parts. The climatically conditioned air below the plant trays 1 is circulated at a velocity which is adjusted in order to yield the desired temperature in the plant roots. The plants will then not be adversely affected by this movement of air below the trays 1 and, accordingly, will not be damaged even though the air velocity below the trays should exceed about 0.4 m/sec., which as mentioned above, is the acceptable maximum air velocity to which the foliage of the plants ought to be exposed.

In practice it may be advantageous to use plant trays 1 with two opposite sides shaped in such a manner that the trays may be joined together according to the mortise and tenon principle or in another manner so as to form a continuous series of plant trays 1. The space 6 below such a series of plant trays 1 will thus form a channel through which the climatically conditioned air circulates.

The plant trays 1 are provided with holes, slots or similar perforations 2, and climatically conditioned air will be pressed up through the holes and create a favorable climate for the plants in the plant stratum 7. During the winter, the warm air rising up through the holes 2 can be observed as a "mirage" in the plant stratum 7, and by means of the arrangement according to the invention it is possible to control the rising warm air, e.g., by varying the air pressure in the pressure chamber 6 and/or the holes 2 in the plant trays 1, so that the desired temperature will only be maintained in the plant stratum 7, whereby significant heat energy is saved which would otherwise have been consumed for maintaining a corresponding temperature in the air space above the plants. During the summer, the rising air will form a cooling air cushion which protects the plants against over-heating, and it is then not necessary to use energy for cooling the air space above the plants. Recovered surplus heat may be stored in a tank filled with liquid or in another manner for use according to demand. Moisture which has drained down into the space 6 below the plant trays 1 or which has been evaporated from the grooves 16 will be taken up by the circulating air and returned to the plant stratum 7 through the holes 2 in the plant trays 1.

Thus, by means of the present arrangement a significant energy saving and reliable climatic control of plant cultures may be obtained, plant cultures being meant to cover both germinated plants and seeds.

The plant tray 1 above has been termed a "plant supporting device", and it is hereby meant that this device will serve to keep the plant cultures in place thereby that the root system, or seeds, of the plant cultures will be present in the depressions 14 of the plant tray 1 with or without a surrounding pot 5, or thereby that the root system, or seeds, of the plant cultures will be present in pots 5 which have been inserted into the openings 3 of the plant trays 1 so that the pots 5 rest against the bottom 4. It is also possible to cultivate some plants, e.g., salad plants, by using the present arrangement whereby the plants are simply suspended in the openings 3 or depressions 14 of the plant tray 1 so that the root system of the plants will be present in the non-enveloped state in the pressure chamber 6 between the plant tray 1 and the bottom 4 and so that the root system will contact the surface 8 for taking up liquid nourishment therefrom. It is also by means of such a suspension system or by use of pots 5 possible that a free slot will be formed along the upper periphery of the openings 3 in the plant tray 1 so that the climatically conditioned air also through these slots may rise from the lower chamber 6.

The term "pot" as used herein is meant to comprise any means which is adapted to receive the root system of the plants, i.e., the ordinary plant pots of any conventional material including peat as well as cultivation bricks, briquettes and cylinders, e.g., of foamed polymers.

The arrangement according to the invention has been tested with plant trays consisting of transparent styrene copolymer having a thickness of about 0.5 mm. The plant trays were provided with holes having a diameter of 3 mm totalling 110 holes in each tray or about 920 holes per m². The plant stratum was covered by a foil or cover of transparent polyethylene having a thickness of 0.08 mm which was kept floating just above the top of the plants by means of the air rising up through the holes in the plant tray. The plant cultures (about 1140 plants) were two year old fir plants in a number of 96 plants per tray or about 800 plants per m², cultivated in pots which were inserted into corresponding openings in the plant trays, the openings having a diameter of 3 cm. 80 m³/m²-h (22.2 1/second) of climatically conditioned air preheated to a temperature of 25° C., were supplied to the space between the bottom and the plant trays of the arrangement, and the conditioned air had the following parameters when entering the plant stratum above the plant trays through the holes in the plant trays: temperature 25° C., relative humidity 30%, absolute humidity 6.0 g/kg and heat contents 7 kcal/kg or 40 kJ/kg. The reduced energy transmission loss from the restricted growth volume beneath the plastics cover compared with the conventional energy transmission loss without the plastics cover but otherwise under similar growth conditions was as high at 75%. The air temperature of the surrounding room was 20.9° C., the relative humidity 38.0% and the absolute humidity 5.6 g H₂O/kg. The cover of transparent polyethylene was simply draped by hand over the plant trays with some overlap on all sides.

What is claimed is:

1. An arrangement for greenhouses and growth rooms for enhancing the growth of plants and germination of seeds, comprising a substantially planar plant tray of a transparent material for the through-passage of light radiations, said plant tray being provided with openings for the receipt of pots containing plants or seeds in a growth medium; a bottom constructed of a heat insulation material, said bottom having a radiation absorbing surface for absorbing said light radiations which faces the plant tray and is arranged underneath the plant tray at a vertical distance from the plant tray to provide a space between the plant tray and the bottom, said space being encompassed by walls extending upwardly from the bottom to the plant tray so as to form a space which is closed laterally and downwardly, means for the introduction of climatically conditioned air into said space, an insulating surface being located beneath said heat absorbing surface, means in said surfaces facilitating the flow of liquid nourishment to the plants, and holes provided in the plant tray between said openings to permit said climatically conditioned air to flow from said space through said holes and in a substantially vertical direction upwardly above the plant tray after having passed through said holes, whereby climatically favorable plant growth conditions are created at least above the plant tray extending upwardly of the plant tray to at least that height defind by the height of the plants.

2. An arrangement for greenhouses and growth rooms for enhancing the growth of plants and germination of seeds, comprising a substantially planar plant tray of a transparent material for the passage therethrough of light radiations, said plant tray being provided with openings capable of receiving pots containing plants or seeds, a bottom constructed of a heat insulation material and provided with a heat absorbing surface for the absorption of said light radiations, said heat absorbing surface facing the plant tray and being arranged underneath the plant tray at a vertical distance from the plant tray so as to provide a chamber between said bottom and said plant tray, said chamber having climatically conditioned air introduced therein, holes in the plant tray arranged intermediate said openings to permit said climatically conditioned air to flow upwardly therethrough from said chamber for creating climatically favorable plant growth conditions in the plant stratum at least above the plant tray; a heat insulating surface being located below said heat absorbing surfaces; and means in said surfaces to facilitate the supply of liquid nourishment to the plants.

3. An arrangement according to claim 2, comprising a flat insulating cover which is kept adjustably floating above the plant stratum by the climatically conditioned air flowing upwardly from the chamber through the holes in the plant tray.

4. An arrangement according to claim 2, comprising a flat shadowproducing cover for reducing transmittance of incident light which cover is kept adjustably floating above the plant stratum by the climatically conditioned air flowing upwardly from the chamber through the holes in the plant tray.

5. An arrangement for greenhouses and growth rooms for enhancing the growth of plants and germination of seeds, comprising a substantially planar plant tray of a transparent material for the through-passage of light radiations, said plant tray being provided with depressions for the containment of plants or seeds, a bottom constructed of a heat insulation material, a radiation absorbing surface on said bottom facing the plant tray being arranged underneath the plant tray for absorptions of said light radiations at a vertical distance from the plant tray to provide a chamber between said bottom and said plant tray for the receipt of climatically conditioned air, holes extending through the plant tray intermediate said depressions to permit said climatically conditioned air to flow upwardly therethrough from said chamber for creating climatically favorable plant growth conditions in the plant stratum at least above the plant tray, and means in said radiation absorbing surface and heat insulation material to facilitate the supply of liquid nourishment to the plants.

6. An arrangement according to claim 5, comprising a flat insulating cover which is kept adjustably floating above the plant stratum by the climatically conditioned air flowing upwardly from the chamber through the holes in the plant tray.

7. An arrangement according to claim 5, comprising a flat shadow-producing cover for reducing transmittance of incident light which is kept adjustably floating above the plant stratum by the climatically conditioned air flowing upwardly from the chamber through the holes in the plant tray.

* * * * *